United States Patent [19]
Obara

[11] Patent Number: 5,698,919
[45] Date of Patent: Dec. 16, 1997

[54] INTEGRAL BEARING TYPE ELECTRIC MOTOR

[75] Inventor: Rikuro Obara, Nagano-ken, Japan

[73] Assignee: Minebea Kabushiki-Kaisha, Nagano-ken, Japan

[21] Appl. No.: 546,753

[22] Filed: Oct. 23, 1995

Related U.S. Application Data

[63] Continuation-in-part of Ser. No. 148,627, Nov. 8, 1993, abandoned.

[30] Foreign Application Priority Data

Nov. 9, 1992 [JP] Japan .................. 4-323645

[51] Int. Cl.$^6$ .................. H02K 7/14; H02K 7/08
[52] U.S. Cl. .................. 310/90; 310/67 R
[58] Field of Search .................. 310/67 R, 156, 310/90; 360/98.07, 99.04, 99.08; 384/227

[56] References Cited

U.S. PATENT DOCUMENTS

| | | | |
|---|---|---|---|
| 3,230,408 | 1/1966 | Baudot | 310/268 |
| 4,607,182 | 8/1986 | Ballhaus | 310/90 |
| 4,713,704 | 12/1987 | Voll et al. | 360/99.08 |
| 4,980,587 | 12/1990 | Yonei et al. | 310/67 R |
| 5,045,738 | 9/1991 | Hishida et al. | 310/90 |
| 5,128,571 | 7/1992 | Itsu | 310/67 R |
| 5,157,295 | 10/1992 | Stefansky et al. | 310/67 R |
| 5,160,866 | 11/1992 | Hishida et al. | 310/90 |
| 5,177,650 | 1/1993 | Jabbari et al. | 360/99.08 |
| 5,200,866 | 4/1993 | Frugé et al. | 360/99.08 |
| 5,256,922 | 10/1993 | Tanaka et al. | 310/67 R |
| 5,274,288 | 12/1993 | Stefansky | 310/90 |
| 5,280,207 | 1/1994 | Nishmura | 310/67 R |
| 5,334,895 | 8/1994 | Morioka et al. | 310/67 R |
| 5,352,947 | 10/1994 | MacLeod | 310/67 R |
| 5,391,952 | 2/1995 | Simazu et al. | 310/90 |

FOREIGN PATENT DOCUMENTS

| | | | |
|---|---|---|---|
| 3540363 | 6/1986 | Germany . | |
| 4-168948 | 6/1992 | Japan | 310/90 |

*Primary Examiner*—Clayton E. Laballe
*Attorney, Agent, or Firm*—Lowe, Price, LeBlanc & Becker

[57] ABSTRACT

An integral bearing type electric motor is disclosed, which comprises a bearing body including a spindle, a sleeve surrounding the spindle, an inner or outer ring fitted in or on the spindle, and balls provided between the spindle and sleeve, between the spindle and outer ring or between the inner ring and sleeve. A hub for the rotor of the motor, a flange for the base of the motor or a stator yoke holder is formed by molding together with the sleeve, spindle or inner ring of the bearing body. The number of components is reduced, the number of assembling steps can be reduced, and reduction of the cost of manufacture can be expected.

17 Claims, 4 Drawing Sheets

INTEGRAL BEARING TYPE ELECTRIC MOTOR

This application is a continuation in part of application Ser. No. 08/148,627 filed Nov. 8, 1993 now abandoned.

BACKGROUND OF THE INVENTION

1. Field of the Invention

This invention relates to electric motors mainly applied to the office automation apparatuses.

2. Description of the Prior Art

FIG. 11 shows an electric motor, for instance a spindle motor. The motor comprises a spindle, a hub as rotor, a flange as base, and a yoke holder. The spindle is supported in a ball bearing, which comprises an inner and an outer ring provided in a bearing sleeve. These components are provided as independent parts, and such components as the hub, flange, yoke holder, etc. are separate parts from the ball bearing. Thus, the prior art motor uses conventional double-row outer rings which, as shown in FIG. 11, are provided separately from and within the sleeve, to provide races for the double-row of ball bearings.

Since the prior art motor comprises the hub, flange and yoke holder as separate parts from the ball bearing, it has a large number of components. Such a configuration of separate elements increases an outer diameter of the hub (i.e., an outer diameter of the rotor). Besides, in manufacture a step of assembling the components on the ball bearing is necessary. The manufacture thus involves a large number of steps and leads to a high cost.

Further, since in the prior art structure the individual components are independent parts, it is not easy to provide accurate raceway run-out with side when assembling the individual components. Therefore, improvement of the raceway run-out with side can not be substantially expected.

SUMMARY OF THE INVENTION

An object of the invention is to provide an electric motor, particularly, a spindle motor, which comprises a reduced number of components and can reduce the steps of assembling to permit reduction of the cost of manufacture to be expected, as well as permitting improvement of the race-way run-out with side.

It is a further object of the invention to provide an electric motor with a reduced component count, to eliminate a prior art requirement for double-row outer rings for ball bearings, and to provide a motor structure wherein a sleeve thereof serves both as an outer ring member for the ball bearings and as a central boss of the hub, thus permitting the motor to be manufactured with a smaller outer diameter for the hub.

To attain the above object, it is a basic structure of the electric motor according to the invention that any of a hub operating as a rotor of the motor, a flange operating as a base of the motor or a stator yoke holder of the motor is formed together with a sleeve, a spindle or an inner ring of a bearing body.

More specifically, according to the invention there is provided an integral bearing type electric motor, which comprises a bearing body including a spindle, a sleeve surrounding the spindle, an inner or outer ring fitted in or on the spindle, and balls provided between the spindle and sleeve, between the spindle and outer ring or between the inner ring and sleeve, a hub for the rotor of the motor, a flange for the base of the motor or a stator yoke holder being formed by machining or together with the sleeve, spindle or inner ring of the bearing body.

According to the invention, there is further provided an integral bearing type electric motor, which comprises a bearing body including a stepped spindle having a large and a small diameter portion, a sleeve surrounding the spindle, the spindle having a large diameter portion thereof formed with an outer race for one ball row, balls in one row being provided between the outer race and an inner race formed in the sleeve, and an inner ring fitted on the small diameter portion of the spindle and having an outer race, balls in another row being provided between the inner ring outer race and a corresponding inner race formed in the sleeve, a hub of the motor being formed by machining or molding together with the sleeve of spindle.

According to the invention, there is further provided an integral bearing type electric motor, which comprises a bearing body including a stepped spindle having a large and a small diameter portion, a sleeve surrounding the spindle, the spindle having a large diameter portion thereof formed with an outer race for one ball row, balls in one row being provided between the outer race and an inner race formed in the sleeve, and an inner ring fitted on the small diameter portion of the spindle and having an outer race, balls in another row being provided between the inner ring outer race and a corresponding inner race formed in the sleeve, a flange as the base of the motor being formed by machining or molding together with the sleeve or spindle of the bearing body.

According to the invention, there is further provided an integral bearing type electric motor, which comprises a bearing body including a stepped spindle having a large and a small diameter portion, a sleeve surrounding the spindle, the spindle having a large diameter portion thereof formed with an outer race for one ball row, balls in one row being provided between the outer race and an inner race formed in the sleeve, and an inner ring fitted on the small diameter portion of the spindle and having an outer race, balls in another row being provided between the inner ring outer race and a corresponding inner race formed in the sleeve, a yoke holder having a yoke mounting rib formed on the outer periphery edge being formed by machining or molding together with the sleeve of the bearing body.

DETAILED DESCRIPTION OF THE PREFERRED EMBODIMENTS

Now, preferred embodiments of electric motor using composite bearing according to the invention will be described in detail with reference to the drawings.

Figure 1:
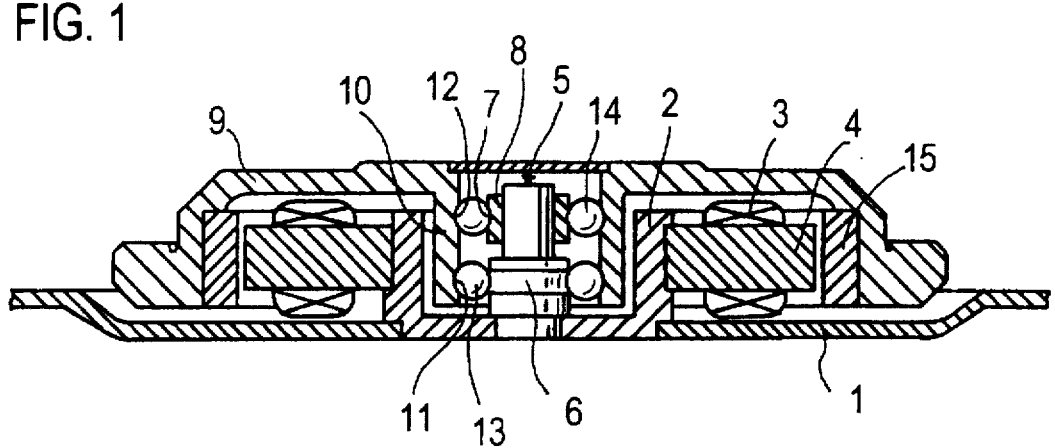
FIG. 1 is a sectional view showing a first embodiment of the invention.
Figure 2:
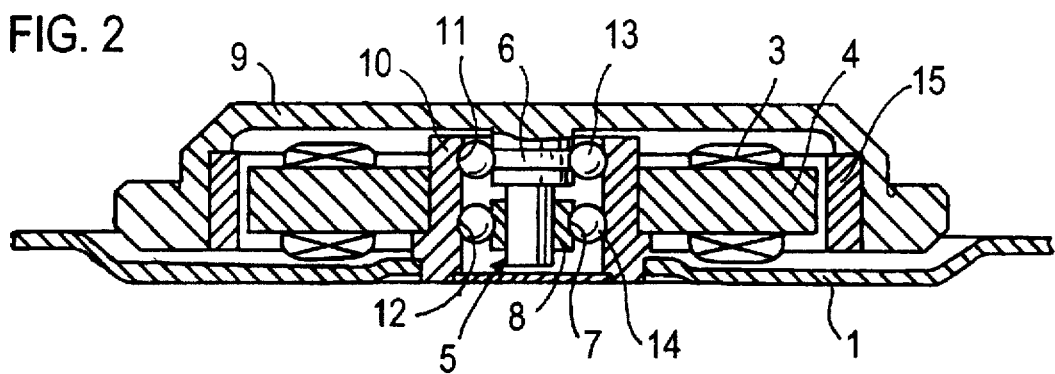
FIG. 2 is a sectional view showing a second embodiment of the invention.

FIGS. 1 and 2 show outer rotor type spindle motors according to the invention.

In the embodiment shown in FIG. 1, a flange 1 as base has its central portion provided with a cylindrical yoke holder 2, and a stator yoke 4 with a coil 3 is provided around the yoke holder. A spindle 5 is secured at its lower end to the center of the flange, more specifically the center of the bottom of yoke holder 2. The spindle is a two-step spindle with a small diameter upper portion.

The outer periphery of the lower large diameter portion of the spindle is formed with an outer race 6, and an inner ring 8 with an outer race 7 is fitted on the small diameter portion of the spindle.

According to the invention, a hub 9 as rotor has a central integral sleeve 10 for a bearing body. The hub 9 may be formed together with the sleeve 10 in a single, integrated, one-piece structure by means of a machining or molding operation. In a molding operation, the hub and sleeve may be formed as a one-piece structure from a mixture of an iron powder and a thermoplastic synthetic resin powder by an injection molding means. Sleeve 10 thus forms an outer ring member for a ball bearing body, including races for the ball bearings. As seen in FIG. 1, it is the sleeve portion of the hub, or the central boss of the hub, which includes therein the races for the ball bearings. The inner periphery of the sleeve 10 has juxtaposed inner races 11 and 12 respectively corresponding to the large diameter portion race of the spindle and the race of the inner ring. Balls 13 and 14 are provided between mating ones of the races. The sleeve 10, balls 13 and 14, inner ring 7 and race 6 of the large diameter portion of the spindle, form the ball bearing body, which supports the hub for rotation about the spindle. A magnet 15 for forming field magnetic flux is provided on the inner periphery of the hub such that it faces the yoke.

In the embodiment shown in FIG. 2, a sleeve 10 for a ball bearing body is provided in a central portion of a flange 1. A spindle 5 is provided, by machining or molding for example, such that it is integral with the underside of a central portion of a hub 9. The spindle is a two-step one and vertically converse to that shown in FIG. 1, and structural relationship among spindle race 6, inner ring 8, race 7 thereof, sleeve races 11 and 12 and balls 13 and 14 is the same as that in the case of FIG. 1. In this embodiment, the stator yoke 4 is mounted on the sleeve 10, and the yoke holder 2 shown in FIG. 1 is dispensed with.

Figure 3:
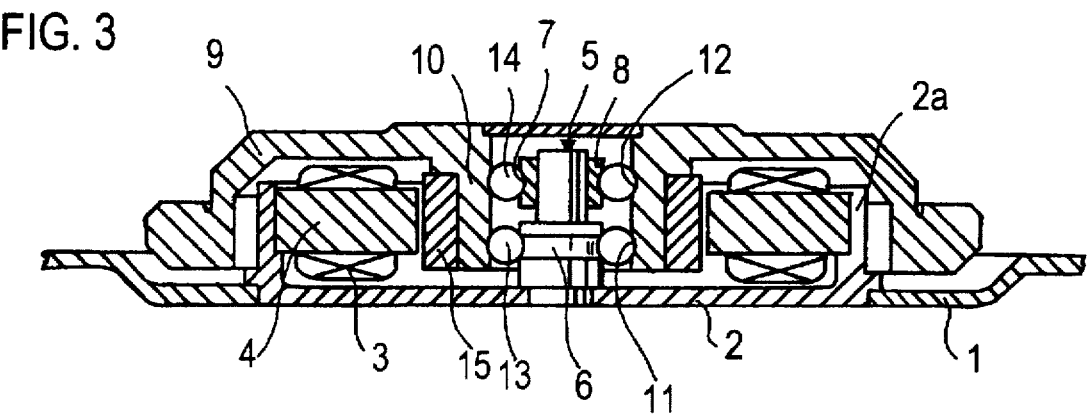
FIG. 3 is a sectional view showing a third embodiment of the invention.
Figure 4:
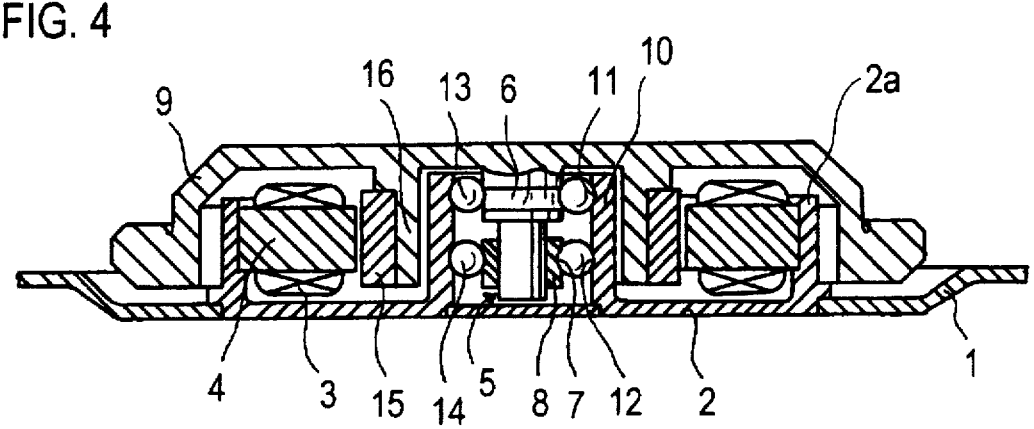
FIG. 4 is a sectional view showing a fourth embodiment of the invention.

FIGS. 3 and 4 show inner rotor type spindle motors according to the invention.

In the embodiment shown in FIG. 3, a two-step spindle 5 is erected from the bottom center of a stator yoke holder 2 having an outer flange 1. A stator yoke 4 is mounted in the inner periphery of a cylindrical rib 2a of the stator yoke holder.

In this embodiment, the sleeve 10 for the ball bearing body is formed, by machining or molding for example, such that it is integral with the center of the hub 9. The structure of the ball bearing body is the same as in the embodiment of FIG. 1, but a permanent magnet 15 is provided on the outer periphery of the sleeve 10.

In the embodiment shown in FIG. 4, by machining or molding a stator yoke holder 2 and sleeve 10 of the ball bearing body are made integral with each other, and a spindle 5 and hub 9 are made integral with each other. A stator yoke 4 is provided in the inner periphery of a rib 2a of the stator yoke holder 2, and a permanent magnet 15 is provided on the outer periphery of a cylindrical magnet holder 16, which is formed by molding such that it is integral with the center of the underside of the hub 9. The spindle is of two-step structure, and the ball bearing body is of the same structure as that in the embodiment shown in FIG. 2.

In each embodiment, the inner surface (top surface) of the flange is provided with a printed circuit board for motor driving in correspondence to the coil 3.

Beside the above embodiments, there are many variations such as those, in which the hub or flange is made integral with the sleeve, spindle, inner ring or outer ring of the ball bearing body. Some of such variations are given below.

Figure 5:
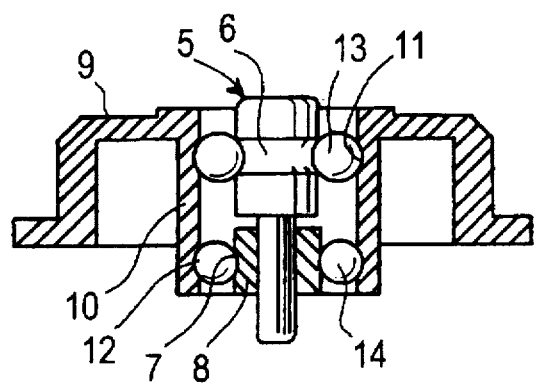
FIG. 5 is a sectional view showing a fifth embodiment of the invention.
Figure 6:
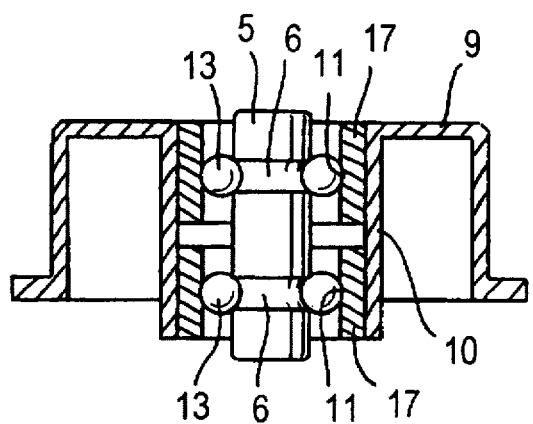
FIG. 6 is a sectional view showing a sixth embodiment of the invention.
Figure 7:
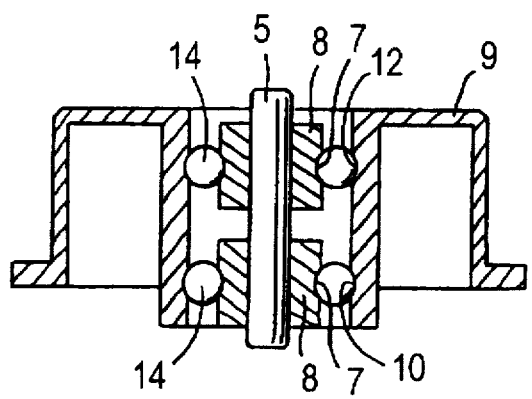
FIG. 7 is a sectional view showing a seventh embodiment of the invention.
Figure 8:
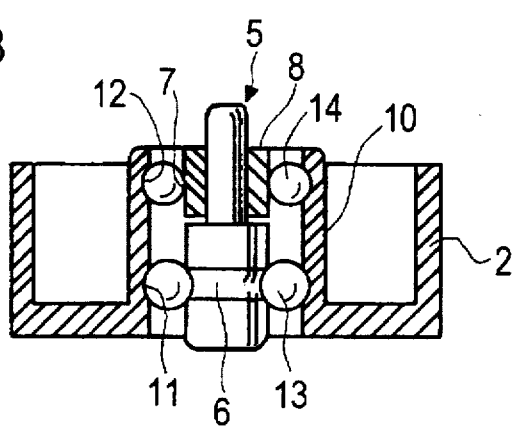
FIG. 8 is a sectional view showing an eighth embodiment of the invention.
Figure 9:
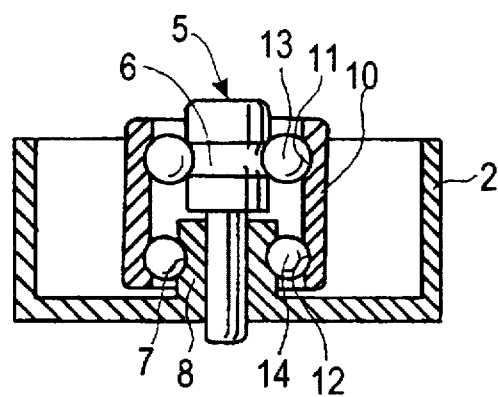
FIG. 9 is a sectional view showing a ninth embodiment of the invention.
Figure 10:
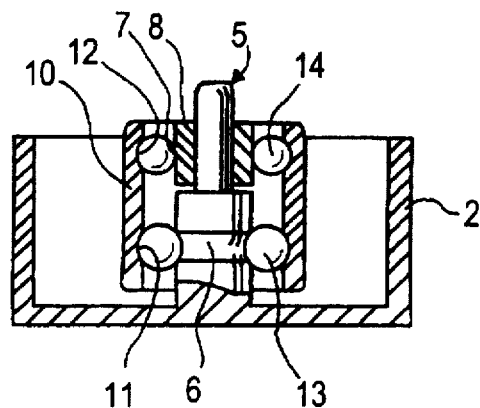
FIG. 10 is a sectional view showing a tenth embodiment of the invention.
Figure 11:
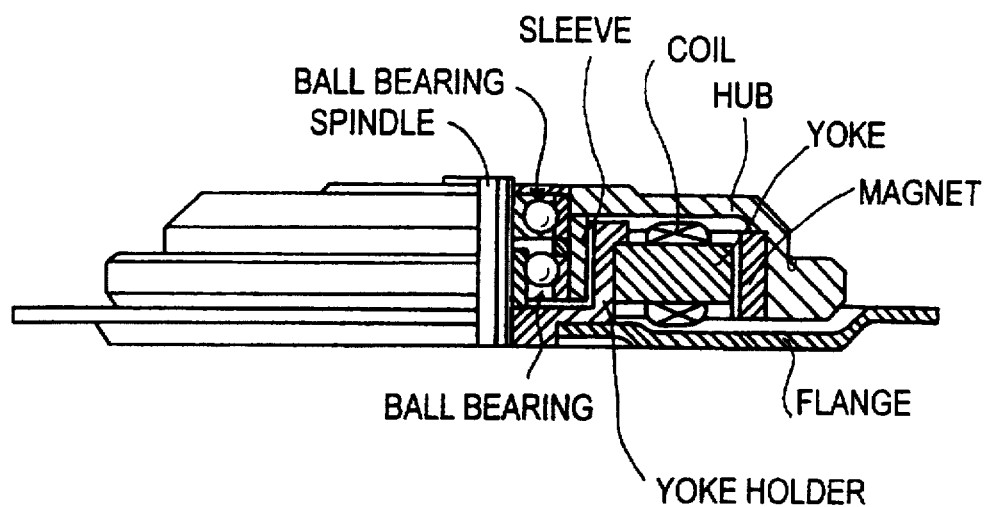
FIG. 11 is a sectional view showing a prior art spindle motor.
Figure 12:
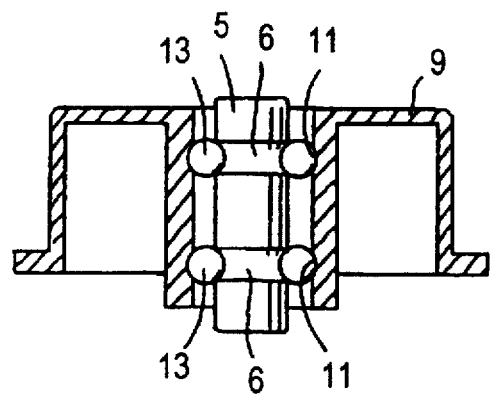
FIG. 12 is a sectional view of an eleventh embodiment of the invention.

In the examples shown in FIGS. 5 to 7, a hub 9 and a sleeve 10 of ball bearing body are formed together to form a one-piece unit by machining or molding. In the embodiment shown in FIG. 6, the spindle 5 is seen to have two outer races formed thereon, shown as a double-row of races 6, 6. In this embodiment are provided a pair of outer rings 17, 17 within the sleeve 10, having respective inner races 11, 11. Two sets of balls, 13, 13 are provided between the double row of outer races 6, 6 on the spindle and the double rows of inner races 11, 12. Although the illustrated inner races are shown as being formed in the outer rings 17, 17, in a variation shown in FIG. 12 the double rows of inner races may be formed in an inner peripheral portion of the sleeve 10, similarly to the illustrations of the inner races 11 provided for the outer races 6 in the embodiments of FIGS. 2 and 3. In the embodiment shown in FIG. 7, a pair of inner rings 8, 8 are provided on spindle 5. The double inner rings 8, 8, have respective outer races 7, 7. Two sets of balls, 14, 14 are provided between the outer races 7, 7 and two rows of inner races 12, 12 formed in the sleeve 10. In the example shown in FIG. 8, the flange and sleeve 10 of ball bearing body are formed together. In the example shown in FIG. 9, the flange and inner ring 8 of ball bearing body (which inner ring is integral with the flange) are formed together. In the example shown in FIG. 10, the flange and spindle are molded together.

As has been described in the foregoing, according to the invention the hub as rotor or the flange as base or the yoke holder is formed such that it is integral with the sleeve or spindle or inner or outer ring of the bearing body. Thus, unlike the prior art bearing structure, in which the hub or flange or yoke holder is a separate part from the bearing body, assembling at the time of the manufacture can be readily made, efficient assembling can be obtained by using machines, and the cost of manufacture can be reduced, which are very beneficial in the industrial production.

Further, at least either of such parts as the hub, flange and yoke holder is preliminarily formed together with the sleeve, spindle, inner ring or outer ring of the ball bearing body. Thus, it is possible to provide a motor, which is free from raceway and has high raceway run-out with side, which does not require any centering of the spindle with respect to the component noted above during its manufacture.

Further, the composite bearing has an advantage in manufacture that pre-loading can be readily effected by urging the inner and outer rings to each other in their axial direction.

What is claimed is:

1. An integral bearing type electric motor comprising: a stator (2, 3, 4); a unitary, one-piece monolithic machined rotor, said one-piece machined rotor including in its monolithic structure a sleeve (10) and a hub (9) including a disc; a bearing assembly (5, 8, 10), said bearing assembly including a stepped spindle (5) having a large diameter portion and a small diameter portion; said sleeve (10) surrounding said spindle; said large diameter portion of said spindle (5) formed with an outer race (6) for one ball row, balls (13) in said one row being provided between said outer race (6) and an inner race (11) formed in said sleeve (10); an inner ring (8) fitted on the small diameter portion of said spindle (5) and having an outer race (7); and balls (14) in another row being provided between said inner ring outer race (7) and a corresponding inner race (12) formed in said sleeve (10), said sleeve being integrally machined with said hub in said unitary, monolithic rotor of said electrical motor.

2. An integral bearing type electric motor as claimed in claim 1, wherein said stator (2, 3, 4) comprises a stator yoke (4) with a coil (3) wound thereon, and a cylindrical yoke holder (2, 2a) for positioning said yoke.

3. An integral bearing type electric motor as claimed in claim 2, including a magnet (15) mounted on the hub (9) so as to face said yoke (4).

4. An integral bearing type electric motor as claimed in claim 3, wherein said magnet (15) is mounted on an inner periphery of said hub (9).

5. An integral bearing type electric motor as claimed in claim 3, wherein said magnet (15) is mounted on an outer periphery of said sleeve (10).

6. An integral bearing type electric motor comprising: a stator; a unitary, one-piece integrated machined rotor, said one-piece machined rotor including therein a sleeve (10) and a hub (9) including a disc; a bearing assembly (5, 8, 10), said bearing assembly including a spindle (5); said, sleeve (10) surrounding said spindle; inner rings (8)(8) fitted on said spindle (5) and having respective outer races (7)(7); and balls (14)(14) being provided between said outer races (7)(7) and double-row inner races (12)(12) formed in said sleeve (10), said sleeve being integrally formed by machining as said unitary, one-piece, structure with said hub (9) as said rotor of said electrical motor from a one-piece blank.

7. An integral bearing type electric motor as claimed in claim 6, wherein said stator comprises a stator yoke (4) with a coil (3) wound thereon, and a cylindrical yoke holder (2, 2a) for positioning said yoke.

8. An integral bearing type electric motor as claimed in claim 7, including a magnet (15) mounted on the hub (9) so as to face said yoke (4).

9. An integral bearing type electric motor as claimed in claim 8, wherein said magnet (15) is mounted on an inner periphery of said hub (9).

10. An integral bearing type electric motor as claimed in claim 8, wherein said magnet (15) is mounted on an outer periphery of said sleeve (10).

11. An integral bearing type electric motor comprising: a stator; a unitary, one-piece machined rotor, said one-piece machined rotor including a monolithic structure incorporating therein a sleeve (10) and a hub (9) including a disc; a bearing assembly, said bearing assembly including a spindle (5); said sleeve (10) surrounding said spindle; and balls (13)(13) being provided between double-row outer races (6)(6) formed on said spindle (5) and double-row inner races (11)(11) formed at said sleeve (10), said sleeve being integrally machined with said hub from a one-piece blank as said unitary, one-piece, rotor of said electrical motor.

12. An integral bearing type electric motor as claimed in claim 11, further comprising a pair of outer rings (17)(17) positioned within said sleeve, said outer rings having respective inner races (11)(11) therein, wherein said balls (13)(13) are positioned between said double-row outer races (6)(6) and said inner races (11)(11) formed in said outer rings (17)(17).

13. An integral bearing type electric motor as claimed in claim 11, wherein said double-row inner races (11, 11) are formed in said sleeve.

14. An integral bearing type electric motor as claimed in claim 11, wherein said stator comprises a stator yoke (4) with a coil (3) wound thereon, and a cylindrical yoke holder (2, 2a) for positioning said yoke.

15. An integral bearing type electric motor as claimed in claim 14, including a magnet (15) mounted on the hub (9) so as to face said yoke (4).

16. An integral bearing type electric motor as claimed in claim 15, wherein said magnet (15) is mounted on an inner periphery of said hub (9).

17. An integral bearing type electric motor as claimed in claim 15, wherein said magnet (15) is mounted on an outer periphery of said sleeve (10).

* * * * *